Patented Oct. 17, 1922.

1,432,365

UNITED STATES PATENT OFFICE.

RAY L. STINCHFIELD, OF ROCHESTER, NEW YORK, ASSIGNOR TO EASTMAN KODAK COMPANY, OF ROCHESTER, NEW YORK, A CORPORATION OF NEW YORK.

CELLULOSE-ETHER SOLVENT AND COMPOSITION.

No Drawing. Application filed March 19, 1921. Serial No. 453,722.

*To all whom it may concern:*

Be it known that I, RAY L. STINCHFIELD, a citizen of the United States of America, residing at Rochester, in the county of Monroe and State of New York, have invented certain new and useful Improvements in Cellulose-Ether Solvents and Compositions (Case B), of which the following is a full, clear, and exact specification.

This invention relates to solvents for making strong solutions of cellulose ether and also relates to the cellulose ether compositions produced by the aid of such solvents. One object of my invention is to provide a solvent which will dissolve such large proportions of cellulose ethers that thick or viscous flowable solutions may be obtained for use in plastic and film making arts. Another object of my invention is to provide a cellulose ether solution which may be manufactured into strong, flexible, transparent film on the machines and by the methods now in use.

In U. S. Patent No. 1,188,376, Lilienfeld, June 20, 1916, there are disclosed a series of alkyl ethers of cellulose. Certain of these are practically insoluble in water, and my invention relates but is not limited to the ethers having that property. While the ethers may form thin solutions in the esters of the lower monocarboxylic fatty acids and the lower monohydroxy aliphatic alcohols, it has been found that such single solvents by themselves do not dissolve a sufficient proportion of the ethers to make a desirably thick composition or dope, such as may be used, for instance, in the manufacture of photographic film base by the customary methods, or in the other plastic arts.

I have discovered that adequately strong and useful compound solvents may be prepared by mixing one or more of the esters of the lower monocarboxylic fatty acids and the lower monohydroxy aliphatic alcohols with tetrachloroethane. By "lower" I include acids and alcohols having less than six carbon atoms in the aliphatic group. The proportions in which the ingredients are combined may be greatly varied. But I find a useful range to be from 3 to 80 parts of the ester and from 97 to 20 parts of the tetrachloroethane. Other viscous compositions suitable for moulding and similar plastic manipulations may be prepared in which the esters exceed 80% of the compound solvent.

The following examples will indicate useful compositions, but my invention is, of course, not restricted to the details thereof. A viscous flowable solution may be prepared by dissolving 10 parts of water-insoluble ethyl cellulose in 45 parts by weight of tetrachloroethane and 15 parts by weight of methyl acetate. Another useful film-forming solution may be prepared by dissolving 10 parts of water-insoluble ethyl cellulose in 30 parts of ethyl acetate and 30 parts of tetrachloroethane.

During film manufacture the volatile esters rapidly evaporate, so that the film sets quickly enough, yet pitting and wrinkling is substantially avoided. Considerable amounts of tetrachloroethane remain in the film and diminish the already small combustibility of the ethyl cellulose, besides imparting a useful degree of additional suppleness to the film.

The ingredients are of the ordinary commercial type, sufficiently purified for the process of film manufacture, so as to give a dope yielding films having the proper relative freedom from color. While I mention methyl acetate and ethyl acetate in the above examples, I may employ any of the esters of acetic acid, propionic acid, butyric acid and methyl alcohol, ethyl alcohol, isopropyl alcohol, propyl alcohol, etc.

Having thus described my invention, what I claim as new and desire to secure by Letters Patent is:

1. A compound solvent for ethers of cellulose, comprising a mixture of tetrachloroethane and an ester of a lower monocarboxylic fatty acid and a lower monohydroxy aliphatic alcohol.

2. A compound solvent for alkyl ethers of cellulose, comprising from 20 to 97 parts by weight of tetrachloroethane and 3 to 80 parts of an ester of a lower monocarboxylic fatty acid and a lower monohydroxy aliphatic alcohol.

3. A compound solvent for alkyl ethers of cellulose, comprising tetrachloroethane and ethyl aceate.

4. A thick viscous composition, comprising an ether of cellulose dissolved in a mixture of tetrachloroethane and an ester of a lower monocarboxylic fatty acid and a lower monohydroxy aliphatic alcohol.

5. A viscous flowable film-forming composition, comprising an alkyl ether of cellulose dissolved in a compound solvent containing from 97 to 20 parts by weight of tetrachlorethane and 3 to 80 parts of an ester of a lower monocarboxylic fatty acid and a lower monohydroxy aliphatic alcohol.

6. A composition of matter, comprising 10 parts of water-insoluble ethyl cellulose dissolved in approximately 30 parts by weight of tetrachloroethane and 30 parts of ethyl acetate.

Signed at Rochester, New York, this 16th day of March 1921.

RAY L. STINCHFIELD.